(Model.)

4 Sheets—Sheet 1.

G. W. BROWN.
CULTIVATOR.

No. 248,992. Patented Nov. 1, 1881.

Fig. I.

Witnesses:
Fred G. Dieterich
P. C. Dieterich

Inventor:
George W. Brown
By W. B. Richards
Atty.

(Model.)
4 Sheets—Sheet 2.

G. W. BROWN.
CULTIVATOR.

No. 248,992. Patented Nov. 1, 1881.

Witnesses:
Fred. G. Dieterich
P. C. Dieterich

Inventor:
George W. Brown
By. W. B. Richards
Atty.

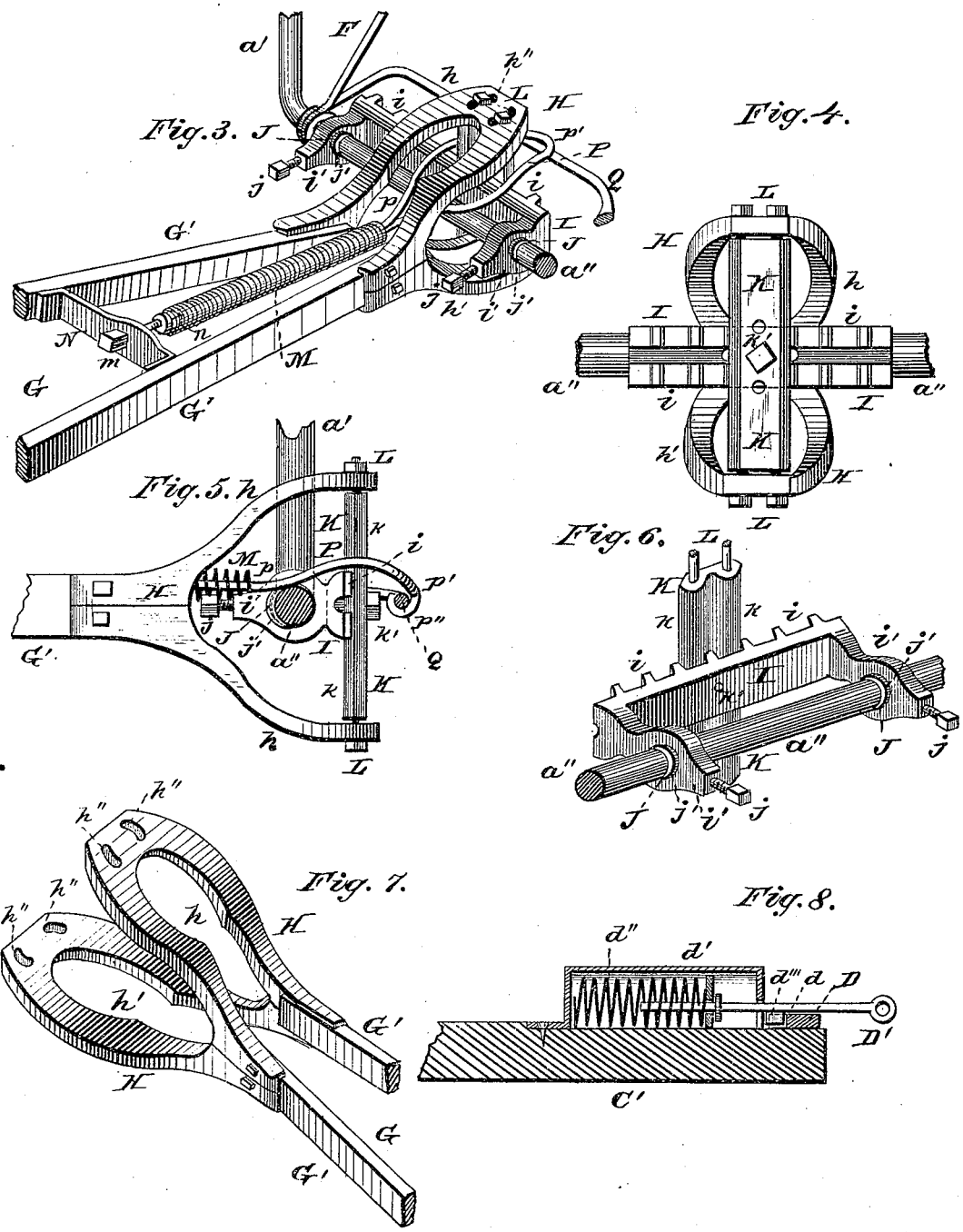

(Model.)

4 Sheets—Sheet 4.

G. W. BROWN.
CULTIVATOR.

No. 248,992. Patented Nov. 1, 1881.

Witnesses:
Fred. J. Dieterich
P. C. Dieterich.

Inventor:
George W. Brown
By. W. B. Richards
Atty

UNITED STATES PATENT OFFICE.

GEORGE W. BROWN, OF GALESBURG, ILLINOIS.

CULTIVATOR.

SPECIFICATION forming part of Letters Patent No. 248,992, dated November 1, 1881.

Application filed June 19, 1880. (Model.)

*To all whom it may concern:*

Be it known that I, GEORGE W. BROWN, a citizen of the United States, residing at Galesburg, in the county of Knox and State of Illinois, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
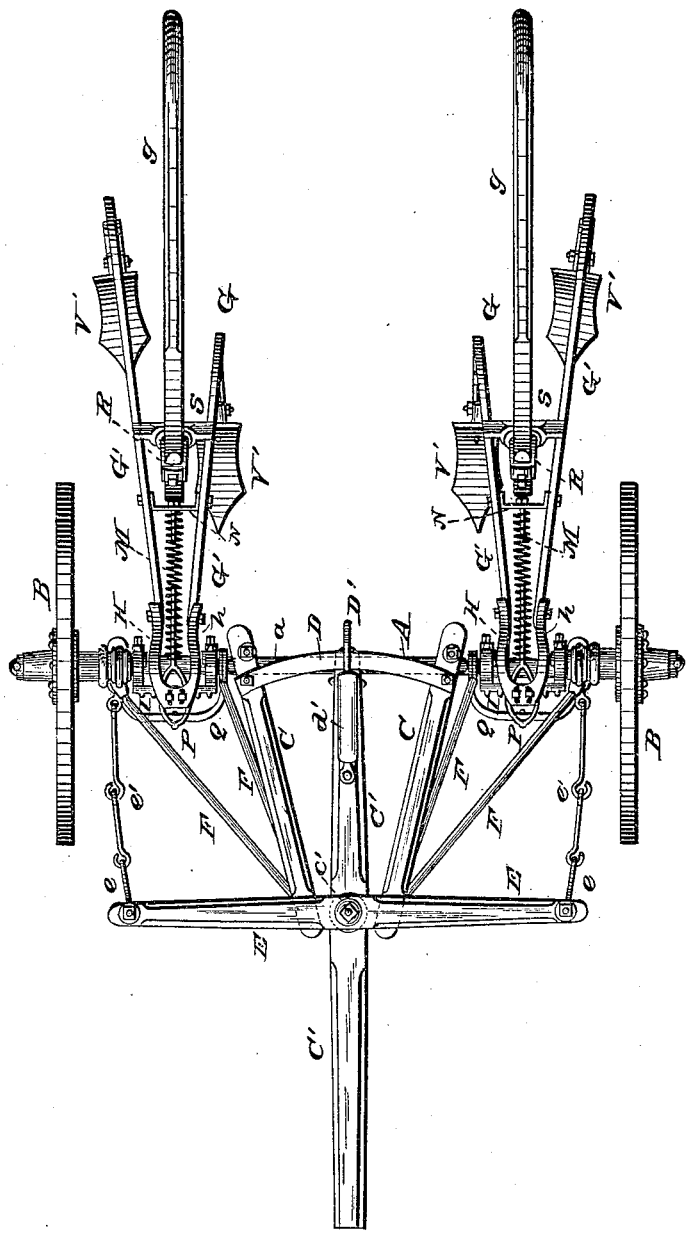
Figure 2:
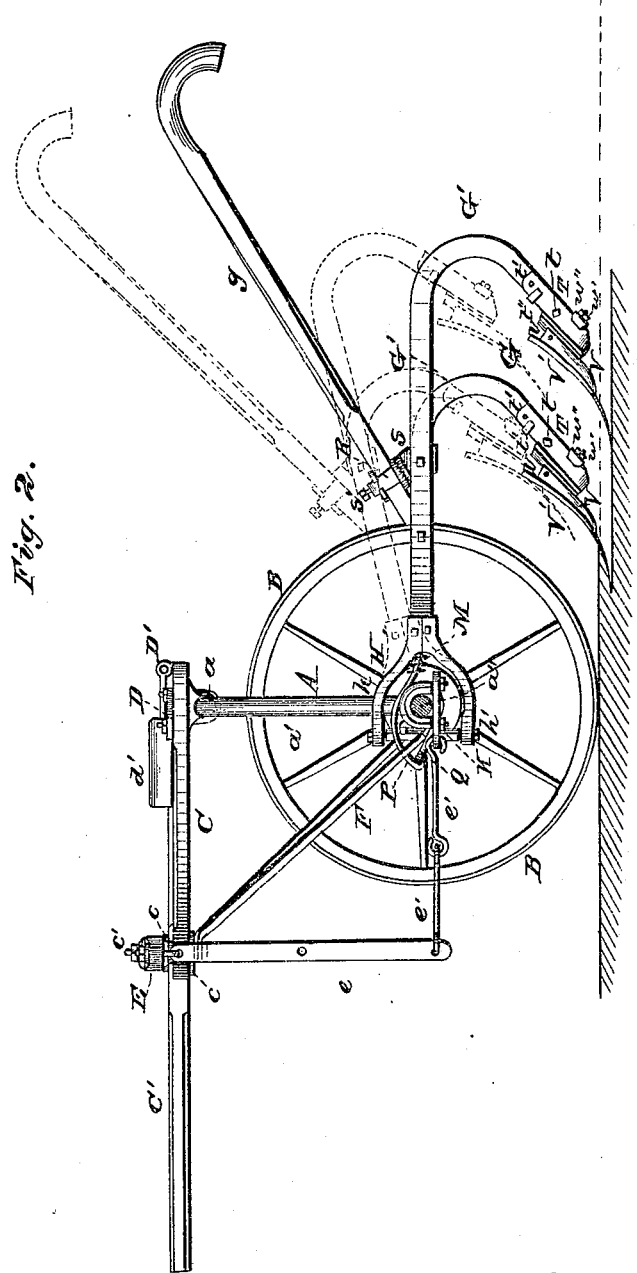
Figure 9:
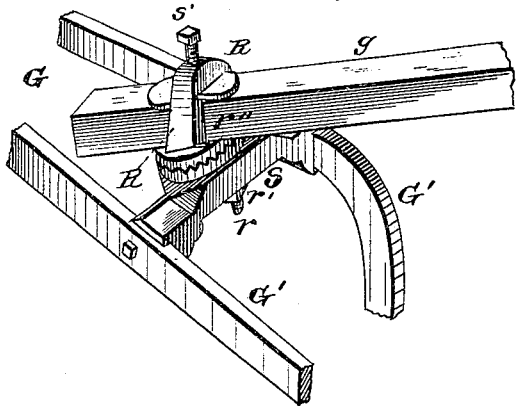
Figure 10:
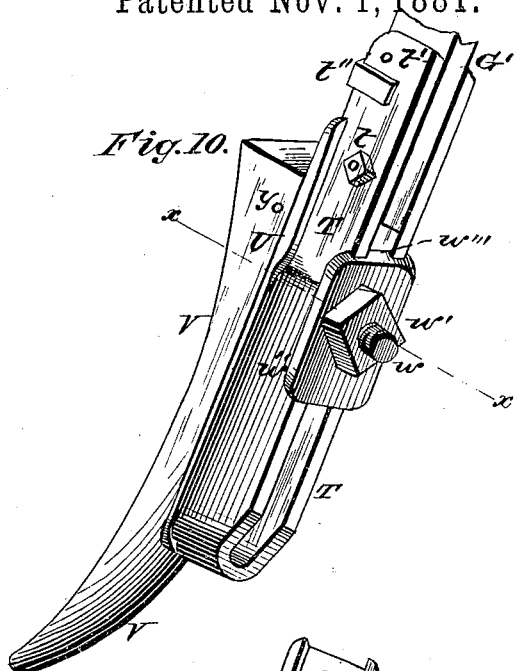
Figure 11:
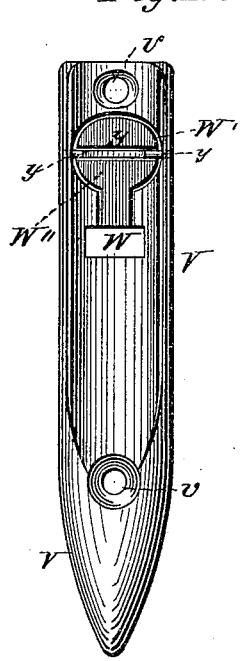
Figure 12:
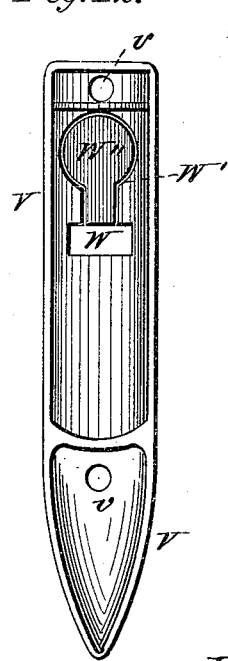
Figure 14:
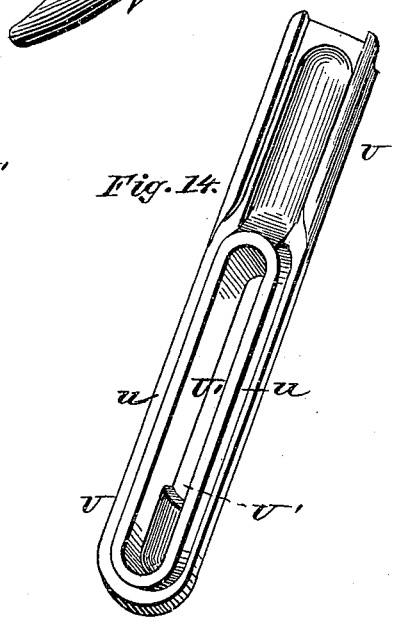
Figure 13:
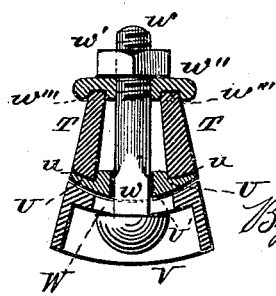

Figure 1 is a top plan of a cultivator embodying my invention. Fig. 2 is a side elevation, the near wheel shown removed. Fig. 3 is an enlarged perspective of one of the couplings of the plow-beams to the axle and adjacent parts. Fig. 4 is a front elevation of the parts shown at Fig. 3. Fig. 5 is a side elevation of the parts shown at Fig. 3. Fig. 6 is a detail perspective, hereinafter referred to. Fig. 7 is a perspective of bracket H. Fig. 8 is a detail sectional elevation, showing manner of locking the pivoted tongue. Fig. 9 is a detail perspective, showing attachment of adjustable plow-handles. Fig. 10 is an enlarged perspective, showing the attachment of the shovel to the standard. Fig. 11 is a rear elevation of the shovel-block. Fig. 12 is a front elevation of the shovel-block. Fig. 13 is a transverse section in the line $x\ x$ in Fig. 10. Fig. 14 is a perspective showing the rear side of the plate between the shovel-block and plates T.

This invention relates to cultivators of that class in which a gang of plows is hinged to each end of an axle or side of a frame and adapted to operate a gang on each side of a row of plants, so as to cultivate both sides of a row of plants at each passage of the machine; and the invention consists, first, in the combination, with an axle or frame and plow-gang, of a spring arranged on substantially the same longitudinal plane as the plow-beam, and connected at one end to the plow-gang, and adapted to move therewith, its other end fulcrumed or connected at or near the pivotal connection of the plow-gang; second, in improvements in the coupling of the plow-beams to the axle, relating to means for adjusting the distance between the plow-gangs, the height of the front ends of the plow-beams holding the plows in the direct line of draft and connection of parts to the axle, as hereinafter set forth, and described in claims hereto annexed; third, in improvements in the connection of the handles to the plow-beams, and of the shovels to the standards, as hereinafter described, and set forth in the claims hereto annexed.

Referring to the drawings by letters, A represents an ordinary cultivator-axle, with horizontal central upper part, $a$, vertical portions $a'$, and horizontal ends $a''$, supported on wheels B. This axle or frame may be of any construction having horizontal parts for the attachment of the plow-beams and the tongue.

C C are bars attached at their rear ends to the part $a$ of the axle, and extending forward and converging at their front ends, where they are connected by upper and lower transverse plates, $c$, between which the tongue $C'$ is pivoted by a bolt $c'$, so as to have lateral vibration.

D is a plate fixed transversely on the rear ends of the bars C, and has a notch, $d$, in its front side, at its mid-length part.

D' is a sliding bolt in a case, $d'$, on the rear end of the tongue, and is pressed rearward by a spring, $d''$, so that a projection, $d'''$, may engage with the notch $d$ in the plate D and hold the tongue in a fixed position when desired. In turning around, and for other purposes, it may be desirable to allow the tongue to vibrate, which may be done by pressing the bolt D' forward and turning it on its longitudinal axis so that the projection $d'''$ extends laterally and will not engage with the notch $d$.

E is the draft-bar or evener, pivoted to the tongue and connected by bars $e$ and links $e'$ to the lower part of the axle in the ordinary manner.

F F are braces, connecting the lower parts of the axle with the front ends of the bars C in the ordinary manner.

G G are the plow-gangs, each formed of two beams, G', and each provided with a handle, $g$. The beams G' of each gang are connected at their front ends by brackets H, each consisting of two U-shaped plates or bars, $h\ h'$, connected at their open ends, where they are bolted to the front ends of the plow-beams, as shown more plainly at Fig. 3. The central or bent portion of one plate, h, extends forward and upward, and the same part of the other plate, h′, extends forward and downward. Each plate h h′ has two segmental slots, h″, at its forward end, as shown at Fig. 7.

I is a plate or joint-piece, and has vertical notches i in its front side, and an extension, i′, at each end and at its rear side. The horizontal parts a″ of the axle pass through holes in the extensions i′, which holes are somewhat elongated, so that semicircular bearing-plates J may be inserted between the rear side of the arm a″ of the axle and the interior side of the extension i′. A set-screw, j, passes through each extension i′ and slightly into one of the plates J, by means of which the parts may be tightened up when worn. The plates J rotate on the axle and prevent the set-screws j coming in contact with the axle and wearing it by raising and lowering the plows. The plates J have interior flanges, j′, to prevent their sliding lengthwise on the axle and from beneath the extensions i′.

K is a plate or joint-piece, with ribs k lengthwise on its rear side, which fit into notches i in the plate I. The plate K may be adjusted in either of the notches i and held after adjustment by a bolt, k′.

L L are bolts passing vertically through the plates K, and projecting therefrom pass through the slots h″ in the plates h h′, and thus secure the plow-gangs to the axle. Vertical movement of the plow-gangs is obtained by the extensions i′ turning on the axle, and lateral movement by the slotted plates h h′ turning on the bolts L. The two bolts form a double bearing for the plow-gang, and while permitting lateral movement in the evident manner will still resist, to some extent, the tendency of the plow-gang to swing to either side when one of the plows of either gang strikes a slight obstruction or harder soil than the other plow.

The distance of the plow gangs apart may be regulated by adjusting the plates K in the different notches of the plates I, and the height of the forward ends of the plow-beams may be adjusted by sliding the plate K up or down in the same notches and securing it by the bolt k′.

Each gang of plows is provided with a lifting-spring consisting of a spiral spring, M, attached at its rear end to a bar, N, by means of a headed and screw-threaded bolt, m, which passes through the bar N and into a nut, n, secured in the end of the spring M by coiling it thereon or otherwise. The bar N connects the plow-beams of each gang some distance back of their front ends.

P is an arm, with its stem or rear end, p, secured in the front end of the spring M, and its front portion formed into an elongated eye, p′, which passes around the plate K and permits of its oscillation. On the forward end of the eye p′ is a hook, p″, by means of which it may be engaged with a bracket, Q, which extends forward of and is connected with the arms a″ of the axle.

When the plow-gangs are in about a horizontal position, or in position for operation in the field, the spring M is in a horizontal plane parallel with the plow-beams, and hence draws endwise on the gang, and does not exert any upward nor downward force thereon, or interfere in any manner with the operation of the plows. When the plow-gang is lowered at its rear end to about a horizontal position, or to any extent below a horizontal position required in operation in cultivating, then the front end of the spring M or the stem p′ strikes and rests on the arm a″ of the axle and prevents the spring exerting any upward or downward force on the plow-gang, because the front end of the spring then vibrates on the same center as the plow-gang, and hence the spring and beams remain in same planes, and the spring can only draw endwise on the beams. As either plow-gang is raised above a horizontal position at its rear end the angle between the spring and the plow-beams will be increased, and hence the spring will exert a greater upwardly-lifting force on the gang. If the tension of the spring is properly adjusted, and when the gang is elevated, as shown by dotted lines at Fig. 2, this force will be sufficient to retain them for local transportation, turning around at the ends of rows, &c., in this elevated position without other aid or support. The upper portion of the plate K will strike the front part of the eye p′ and prevent too great elevation of the rear ends of the plow-gangs. As the springs M become weaker from wear their tension may be increased by screwing the bolt m farther into the nut n.

R is a plate with a threaded stud-bolt, r, at its lower side, which passes through a plate, S, and is secured by a nut, r′. The plate R has a socket, r″, in its upper part, through which the plow-handle g passes, and in which it is held by a set-screw, s′. By loosening the set-screw s′ the handle may be slid forward to lower its rear end or rearward to elevate it, and by loosening the nut on the bolt r the handle may be adjusted laterally at its rear end in the evident manner.

The shovels are attached to the rear ends of the beams or standards, as follows:

T T are plates, one placed on each side and lower end of the beam or standard, with their lower ends extending below the end of the beam and connected, and their upper ends connected to the beam by a pivot-bolt, t, and a wooden break-pin, t′. A strap, t″, connects the plates T at their upper ends, and rests against the front side of the beam, to prevent the plates T being forced forward at their lower ends, while it permits of their being forced backward at their lower ends to break the pin t′ when the shovel strikes an obstruction that might break other parts.

U is a plate, with its front side curved in its cross-section in the arc of a circle, and its rear side having longitudinal grooves u u, which receive and fit onto the front sides of the plates T.

U′ is a slot lengthwise in the plate U.

V is the shovel-block, secured rigidly to the shovel V' by rivets v. The rear side of the block V is grooved lengthwise to fit the front of the plate U and permit turning it thereon to adjust the angle of the shovel laterally to the line of progression in operation.

W is a transverse slot in the block V, through which a bolt, w, passes, and also passes through the slot U' in plate U and through between the plates T, and is secured by a nut, w'. A washer, w'', is placed between the plates T and nut w', with grooves w''' in its front side, which grooves receive the plates T. The grooved washer w'' and grooved plate U hold the lower ends of the plates T securely in place, and the slot W permits of the lateral movement of block V, hereinbefore described. To facilitate removing the bolt w from the block V without detaching block V from the shovel, I intersect the slot W with a slot, W', transverse to it, and having an enlarged upper end, so that the bolt may be slid upward in the slot W' and its head withdrawn through the enlarged part of the slot. To prevent accidental movement of the bolt in the slot W', a plate, W'', is fitted therein and held by a slight bolt, y, which is exposed at the rear side of the plate W'', and may be easily withdrawn to permit removal of the plate W''. The bolt w may be slid up and down in the slotted plate U to raise and lower the shovel on the beam.

To define more exactly the nature of my improvement, it may be stated that I do not claim, broadly, a spring which acts with an upward force on the plow-gang both when in a position for plowing and when in an elevated position, as my spring does not act upon the plow at all when in a working position. Neither do I claim a spring which acts with an upwardly-acting force on the plow-gang when above a working position and with a downwardly-acting force when lowered to a position for plowing, because my spring does not exert any downwardly-acting force on the plow when lowered to a working position. Neither do I claim, broadly, a spring which exerts an increased force on the plow-gang as it is elevated, because such device is not novel at the date of my conception of the invention herein described and claimed.

It will be evident that other means than those described herein may be used for limiting the upward movement of the plow-beams and also the downward movement, and that the springs may be placed below the axle instead of above it, and that in case of single beams the spring may be attached above or below the beam, and in various ways both to single and double beams. My invention is not limited to these details; but

What I claim as new, and desire to secure by Letters Patent, is—

1. The combination, with an axle or frame and plow-gang, of a spring arranged on substantially the same longitudinal plane as the plow-beam, and connected at one end to the plow-gang and adapted to move therewith, and its other end fulcrumed or connected at or near the pivotal connection of the plow-gang, substantially as and for the purpose specified.

2. In combination with an axle and plow-gang, a spring adapted to exert an upwardly-lifting force on the gang when its rear end is elevated above a working position, and to strike a stop when lowered to a working position or below it, which stop will retain plow-beams and spring in same planes and prevent the spring from exerting either lifting or depressing force on the gang.

3. The combination, with the plow-gang, of the adjustable socket-plate R and sliding handle adjustably secured in said plate, whereby said handle is adapted to be adjusted laterally and higher or lower, substantially as and for the purpose specified.

4. The combination of the separate plates T T, connected to the lower end and opposite sides of the beam or standard, and extending below the same, the plate U, provided with longitudinal grooves u u, and the washer w'', with similar grooves, w''' w''', in which the lower side edges of said plates T T fit, substantially as and for the purpose herein shown and described.

5. In combination with the shovel, plates T, plate U, and bolt w, the shovel-block V, slotted substantially as described and for the purpose specified.

6. The combination, with the shovel and standard, to which it is secured by a bolt, w, of a shovel-block, V, slotted as described, and the slot W', closed by a removable plate, W'', substantially as and for the purpose specified.

7. In a cultivator-coupling, the plate I, forward of and hinged to the axle, and provided with notches i in its front side, in combination with the plate K, adjustably attached thereto, substantially as and for the purpose specified.

8. In combination with the plate I, forward of and hinged to the axle, and with the plate K, attached thereto, and provided with projecting bolts L, the brackets H, having segmental slots h'' in their forward ends, substantially as and for the purpose specified.

9. The plates J, constructed as described, in combination with the journal a'', plate I, having extensions i', with holes for journal a'', and the set-screw j, substantially as and for the purpose specified.

In testimony whereof I affix my signature in presence of two witnesses.

GEORGE W. BROWN.

Witnesses:
I. S. PERKINS,
JAMES E. BROWN.